(12) United States Patent
Tsengas

(10) Patent No.: US 6,571,742 B1
(45) Date of Patent: Jun. 3, 2003

(54) INTERACTIVE PET TOY

(76) Inventor: Steven Tsengas, 1300 East St., Fairport Harbor, OH (US) 44077

( * ) Notice: Subject to any disclaimer, the term of this patent is extended or adjusted under 35 U.S.C. 154(b) by 0 days.

(21) Appl. No.: 10/206,645

(22) Filed: Jul. 26, 2002

Related U.S. Application Data

(60) Provisional application No. 60/313,178, filed on Aug. 17, 2001.

(51) Int. Cl.[7] .............................................. A01K 29/00
(52) U.S. Cl. ...................................................... 119/707
(58) Field of Search ................................ 119/706, 707, 119/708, 702

(56) References Cited

U.S. PATENT DOCUMENTS

| | | | |
|---|---|---|---|
| 4,327,668 A | * 5/1982 | Phillips | ....................... 119/707 |
| 4,803,953 A | 2/1989 | Graves | |
| 5,467,740 A | * 11/1995 | Redwine | ..................... 119/707 |
| 5,524,326 A | 6/1996 | Markowitz | |
| 5,634,435 A | 6/1997 | Udelle et al. | |
| 5,651,332 A | * 7/1997 | Moore et al. | ............... 119/708 |
| 5,765,508 A | 6/1998 | Markowitz | |
| 5,782,207 A | 7/1998 | Goodham | |
| 5,794,568 A | 8/1998 | Udelle et al. | |
| 5,823,844 A | 10/1998 | Markowitz | |
| 5,875,736 A | 3/1999 | Udelle et al. | |
| 5,947,790 A | * 9/1999 | Gordon | ...................... 119/707 |
| D414,903 S | * 10/1999 | Baiera et al. | .............. D30/160 |
| 6,058,887 A | 5/2000 | Silverman | |
| 6,371,053 B1 | * 4/2002 | Tsengas | ...................... 119/707 |
| 2001/0027754 A1 | 10/2001 | Tsengas | |

* cited by examiner

*Primary Examiner*—Charles T. Jordan
*Assistant Examiner*—Son T. Nguyen
(74) *Attorney, Agent, or Firm*—John D. Gugliotta; P. Jeff Martin

(57) ABSTRACT

An interactive toy for use with pets is provided and includes a housing having a toy-like object positioned within the housing. The toy-like object is connected to a mechanical locomotion means so that the object can be selectively extended out of the housing and retracted back into the housing.

18 Claims, 5 Drawing Sheets

000000# INTERACTIVE PET TOY

RELATED APPLICATIONS

The present invention is a conversion of a United States Provisional Patent Application, Ser. No. 60/313,178 filed on Aug. 17, 2001.

BACKGROUND OF THE INVENTION

1. Field of the Invention

The present invention relates generally to animal amusement devices and, more particularly, to a novel interactive toy for pets.

2. Description of the Related Art

Many devices for promoting play and interaction between pet and owner are in existence today. Such toys include those resembling a fishing pole with a toy-like object carried on the end of a string. These toys can entertain a cat, dog or other pet; however, the pet may realize that its owner is indirectly operating the toy. Once realized, the pet's attention tends to be divided between the toy and the owner.

Motor powered toys are also known. These toys have a supported toy-like object that is moved mechanically in a manner that may attract the pet. However, this type of device does not promote interaction between the pet and the owner.

The above games tend to be of a type that may be labeled "pursuit-type" games, in that the toy is moved, either by the owner or a machine, and the pet chases it. This type of game depends for its entertainment value on the pet being close enough to success in catching the toy to make the pet attempt to catch it, yet not close enough that it is overly easy. Such games often become equated by the pet to the game of "fetch". Some pets are simply uninterested in this game.

For the foregoing reasons, there is a need for a new type of pet and owner game that is more entertaining than the above summarized games. The new game should provide a structure that promotes a game that is of a type that is more nearly related to the human game of hide-and-seek, or the baby game of peekaboo, and that will capitalize on animals, particularly domestic animals innate interest in hit-and-run and ambush-type games where the hunter is rewarded for his patience. The game should be attractive to both young and old pets, and should maximize interaction between the pet and owner, while somewhat downplaying the need for continuous strenuous physical activity on the part of the pet, which may result in lessened interest.

A search of the prior art did not disclose any patents that read directly on the claims of the instant invention; however, the following references were considered related.

U.S. Pat. No. 4,803,953 issued in the name of Graves discloses a toy for animals which includes a stationary base with a propulsion means for tossing a tethered weighted object a short distance.

U.S. Pat. No. 5,823,844 issued in the name of Markowitz discloses an interactive vibrating toy.

U.S. Pat. No. 5,634,435 issued in the name of Udelle et al discloses an animal amusement and exercise stimulator.

U.S. Pat. No. 6,058,887 issued in the name of Silverman discloses a cat amusement device with a microchip functioning to transmit preselected audio sounds.

U.S. Pat. No. 5,765,508 issued in the name of Markowitz discloses a remotely controlled interactive game between pet and owner.

U.S. Pat. No. 5,875,736 issued in the name of Udelle et al. discloses an animal amusement and exercise stimulator.

U.S. Pat. No. 5,524,326 issued in the name of Markowitz discloses an interactive game between pet and owner being remotely controlled and includes a mechanically movable toy animal.

U.S. Pat. No. 5,782,207 issued in the name of Goodham discloses a pet toy having a toy mouse that is extended from and retracted into a tubular housing.

U.S. Pat. No. 5,794,568 issued in the name of Udelle et al. discloses an animal attractant and scratching device.

Consequently, a need has been felt for providing a new type of pet and owner game that is of a type more nearly related to the human game of hide-and-seek, or the baby game of peekaboo, and that will capitalize on animals, particularly domestic animals innate interest in hit-and-run and ambush-type games where the hunter is rewarded for his patience.

SUMMARY OF THE INVENTION

Therefore, it is an object of the present invention to provide an interactive pet toy game.

It is another object of the present invention to provide an outer housing for holding a toy-like object.

It is another object of the present invention to provide a toy-like object which includes a plastic mouse or other type of object that would be appealing to an animal.

It is another object of the present invention to provide an interactive toy which includes a means for extending or projecting the object through an opening in the housing at least a short distance outside of the housing.

It is another object of the present invention to provide a means capable of retracting so that the mouse goes back into the housing, substantially out of the view of the pet.

It is another object of the present invention to provide a game between a pet owner and a pet, wherein the pet owner operates the means for extending and retracting the object out of the housing, and where the operator can cause the object to extend out of the housing to catch the pet's attention.

It is still another object of the present invention to provide an interactive pet toy game that's attractive to both young and old pets, and that maximizes interaction between the pet and owner.

Briefly described according to one embodiment of the present invention, an interactive pet toy is provided. The pet toy of the present invention comprises an outer housing for holding a toy-like object. The toy-like object may be comprised of a plastic mouse or other type of object that would be appealing to an animal. The interactive toy includes a means for extending or projecting the object through an opening in the housing at least a short distance outside of the housing. The means is also capable of retracting so that the mouse goes back into the housing, substantially out of the view of the pet.

The toy can be used in a game between a pet owner and a pet, wherein the pet owner operates the means for extending and retracting the object out of the housing. The operator can cause the object to extend out of the housing to catch the pet's attention. In addition, the operator can alternatively extend and retract the object to engage in play with the pet.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
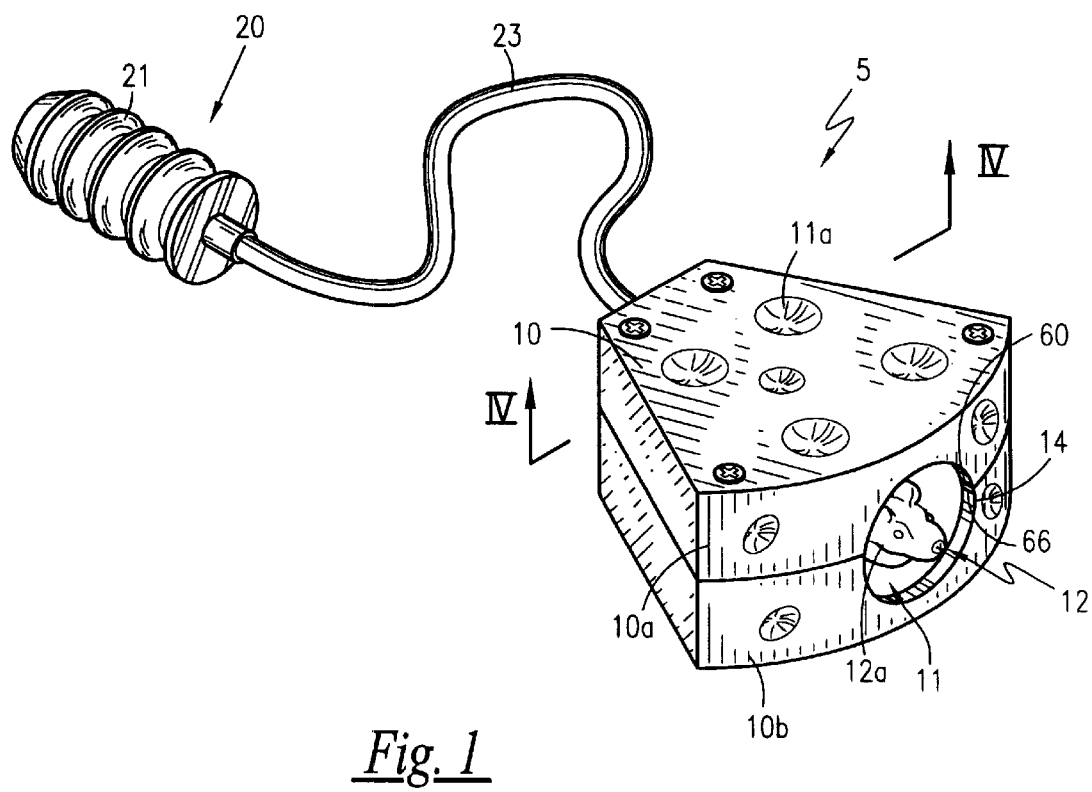
FIG. 1 is a perspective view of an interactive pet toy according to the preferred embodiment of the present invention.
Figure 2:
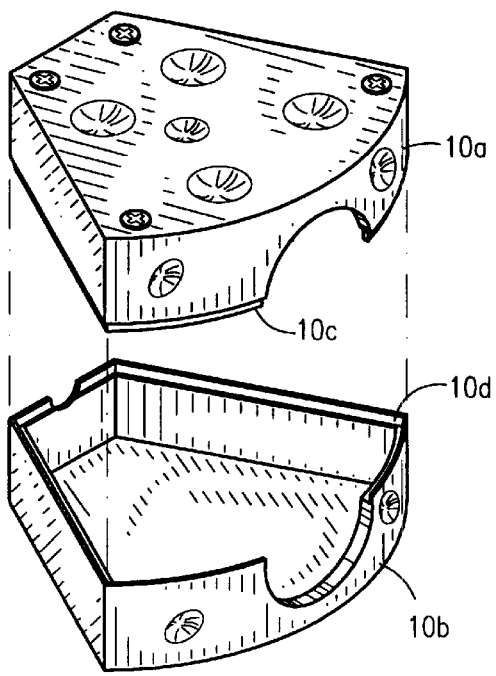
FIG. 2 is an exploded perspective view top plan view of the housing.
Figure 3:
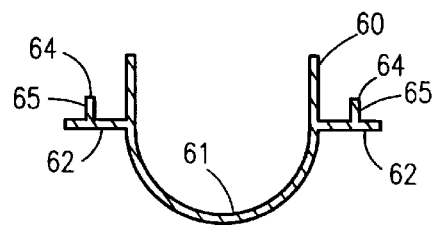
FIG. 3 is a cross-sectional view of the central region of the support carriage.
Figure 4:
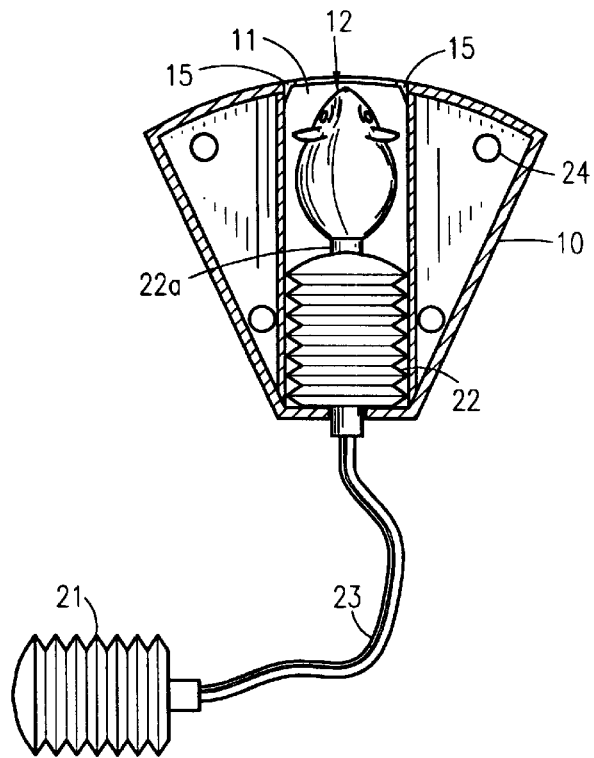
FIG. 4 is a cross-sectional view of the present invention taken along lines IV—IV of FIG. 1 according to the preferred embodiment.
Figure 5A:
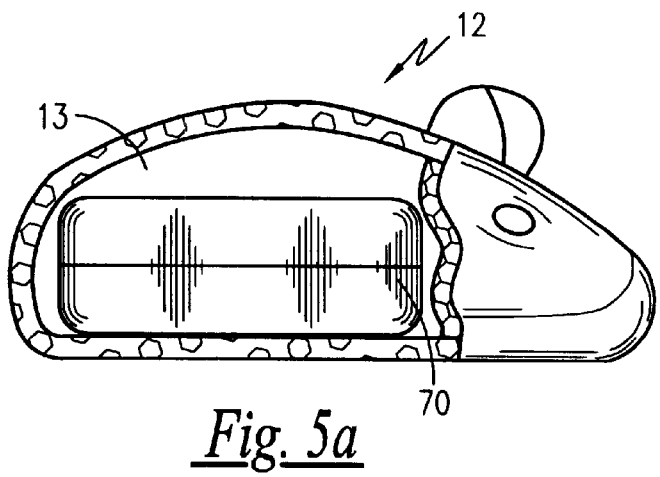
FIG. 5A, is a partial cross-sectional view of the pet amusement object illustrating the sound device housed therein.
Figure 5B:
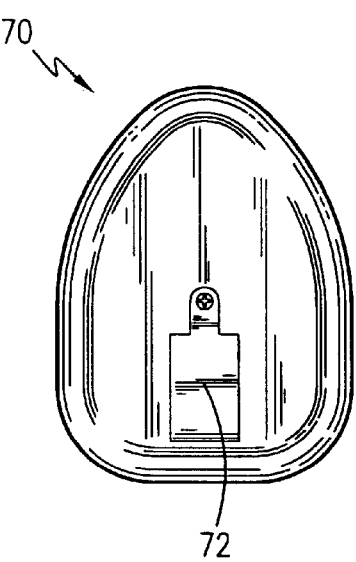
FIG. 5B is a top view of the sound device shown enclosed in the pet amusement object
Figure 5C:
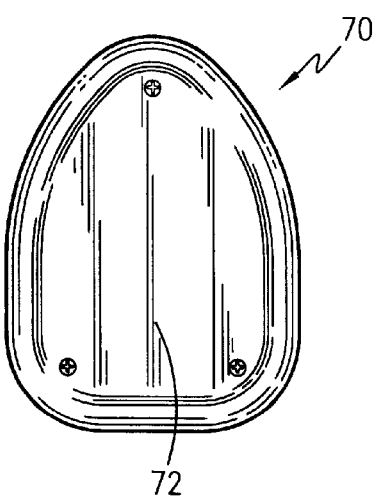
FIG. 5C is a bottom view of the sound device shown in FIG. 5B.
Figure 5D:
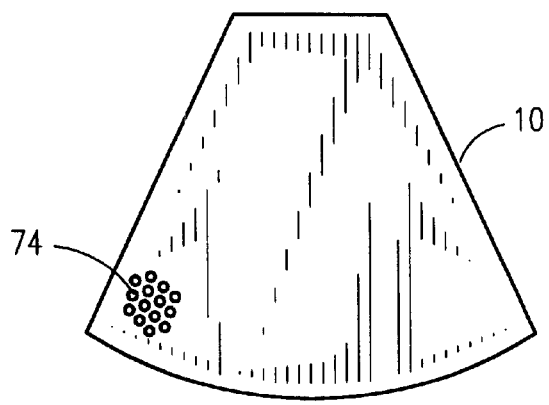
FIG. 5D is a bottom view of the housing illustrating speaker holes according to the preferred embodiment of the present invention.

Referring now to FIGS. 1–4, an interactive pet toy 5 is shown, according to the present invention, comprised of a housing 10 formed so as to represent a slice of Swiss cheese. However, it is envisioned that other shapes for the housing 10 are contemplated by the present invention, including but not limited to, dog houses, bird houses, bones, animal or cartoon figures, boxes, or any other shape with which an animal, in particular, a domestic pet, such as a dog, cat, or hamster may interact.

The housing 10, according to the preferred embodiment, is comprised of a hollow top 10a and a hollow bottom 10b, wherein the top 10a has ridges 10c along an inner surface thereof which match up with corresponding grooves 10d along an inner surface of the bottom 10b, thus allowing the top 10a and bottom 10b to be fittingly joined. The top 10a and bottom 10b are held together via an adhesive, thus forming a housing 10 being closed on all sides, except for an opening 14 in one end thereof. Alternatively, it is envisioned that the housing 10 is substantially solid except for the cavity 11 which accommodates the pet amusement object 12. It is further envisioned that the housing 10 may be formed as a single piece or may be comprised of multiple pieces which fit together. For example, the housing may be comprised of left and right halves which can be bolted together. Alternatively, the left and right halves may have corresponding grooves and ridges on inner surfaces thereof which match up when the halves are place together, and wherein such halves may be held together by clips, adhesives, cam action or other mechanical means.

The opening 14 shown in the figures is circular in shape, but other geometric shapes are clearly within the scope of the present invention. An inside of the housing 10 comprises a cavity 11 coaxially disposed immediately behind opening 14 into which a pet amusement object 12 will fit. In the preferred embodiment, the pet amusement object 12 is illustrated as a toy mouse. In keeping with the popular theory that mice enjoy eating cheese, the toy mouse resides within a housing 10 shaped like a wedge of Swiss cheese. Such housing 10 has depressions 11a along its outer surface to resemble actual cheese. The housing 10 is also yellow or orange in color in order to further accentuate the appearance of a wedge of Swiss cheese. It should be understood that any type of pet toy object may be enclosed in any shape housing and that the housing 10 depicted in the figures is shown by way of example only. For example, a pet toy object may take on many shapes, and simulations, such as other animals, cartoon characters, bones, balls, sticks, newspapers, slippers, balls of yarn, or a plethora of other shapes sparking interest in a pet.

In the preferred embodiment, the pet amusement object 12 is a toy mouse similar to mouse described in U.S. patent application Ser. Nos. 09/802,749 and 09/479,001. However, various other toys may be attached. In addition, snacks, such as bones or pet treats may also be attached to a locomotion means (to be described in greater detail below) to entice a pet to play with the interactive pet toy 5. Additionally, the pet amusement object 12 may be removable, so that the pet may play with different objects in conjunction with the interactive pet toy described herein.

The interactive pet toy 5 further comprises a means of locomotion for the pet amusement object 12. The locomotion means 20 causes the pet amusement object 12 to extend outside of the housing 10 and to retract back into the housing 10. The extension and retraction of the pet amusement object 12 is the focus of the interactive pet toy 5.

The locomotion means 20 comprises a support carriage 60 defined as having U-shaped configuration. The support carriage 60 includes a convex channel 61 having an upper surface upon which a bottom 12a of the pet amusement object 12 is affixed. The support carriage 60 further includes a pair of track arms 62 extending perpendicularly from outer sidewalls thereof. The track arms 62 are designed to slidably engage corresponding elongated slots 66 extending linearly down opposing sidewalls within the cavity 11. Each track arm 62 includes a guide arm 64 being vertically oriented with respect thereto, which provides a contact surface 65 against which the sidewall of the cavity 11 engages, thus preventing lateral movement by the support carriage 60 during propulsion and retraction of the toy mouse.

The locomotion means 20 further comprises a series of bellows which utilizes air in order to push the toy mouse into and out of the housing 10. An external bellows 21, having an accordion shape, is used to force air through an elongated, flexible tube 23 to an internal bellows 22 which is connected to a rear portion of the pet amusement object 12. The internal bellows 22 is defined as having an accordion shape and is smaller in size than the external bellows 21. The internal bellows 22 has a forward end connected to the rear portion of the pet amusement object 12 via adhesive.

For purposes of this disclosure, the mechanical means chosen for connecting the pet amusement object 12 and the internal bellows 22 is meant merely as a suggestion, and is in no way limiting. Thus, it is envisioned that the pet amusement object 12 may alternatively include an air-tight threaded attachment integrally formed at the rear portion thereof which is designed and configured so as to mate with a complementary threaded attachment of the internal bellows 22.

Moreover, it is further envisioned that the pet amusement object 12 may incorporate a projection on an end thereof for slidable engagement within the forward end of the internal bellows 22, whereby the pet amusement object 12 and internal bellows 22 are held together through mechanical impingement.

The only requirement for attaching the pet amusement object 12 to the internal bellows 22 is that the chosen means for attachment is such that a significant amount of air does not escape from the internal bellows when the external bellows 21 is compressed. Hence, substantially air-tight seals between the external bellows 21, the tube 23, the internal bellows 22, and the pet amusement object 12 will achieve maximum functioning of the present invention.

The tube 23 is connected at one end thereof to a forward end of the external bellows 21 via an adhesive, while an opposite end of the tube 23 is connected to a rearward end of the internal bellows via adhesive, wherein such connection being sealed air-tight so as to allow air flow between the external and internal bellows 21, 22, but preventing an escape of air therefrom.

Manual compression of the external bellows 21 forces air into the internal bellows 22 via the tube 22. As air is forced into the internal bellows 22, the internal bellows 22 expands, thus propelling the mouse forward and out of the cavity 11 of the housing 10. When the external bellows 21 is released, the air is forced to flow from the internal bellows 22 back into the external bellows 21 via the tube 23, thereby causing the mouse to retract back into the cavity 11 of the housing 10.

In order to prevent the pet amusement object 12 from overextending out of the housing 10, stopper elements 15 are provided inside a perimeter surface of the opening 14. During use of the present invention, when a forward end 22a of internal bellows 22 touches the stopper elements 15, the pet amusement object 12 is prevented from extending any farther from the housing 10.

Referring now to FIGS. 5A–5D, in order to simulate the natural sound of a selected pet amusement object 12, such as a mouse, an electronic prerecorded sound device 70 is provided. The sound device 70 is held within an interior cavity 13 of the pet amusement object 12. The sound device 70 includes a shaker barrel activator, a prerecorded sound chip and a source of electrical power, such as a battery. If desired, catnip or other pet attractive scent material can be placed in the interior cavity 13, and the catnip, along with the outward appearance of the particular pet toy object, will attract pets, such as, for example, cats. As other shapes, in addition to a mouse, can be used for the pet amusement object 12, the chosen shape would simulate natural prey animals for the pet, such as mice, birds, etc.

The sound device 70 preferably emits a prerecorded sound in response to movement or propulsion/retraction of the pet amusement object 12. Thus, as the external bellows 21 is compressed, a prerecorded sound is activated. This prerecorded sound can be a "permanent" prerecorded sound such as an animal's voice, such as "meow" or "purr," a beeping sound, a human voice, laughter, such as "ha, ha, ha" or some other desired sound, or can be recorded, and re-recorded, as desired, by the user. The prerecorded sound may continue for a predetermined time period, for example five (5) seconds, and then stops or may continue as long as the sound device 70 is sensing motion of pet amusement object 12. Preferably, when the pet amusement object 12 simulates a natural prey of the pet, the pre-recorded sound is a simulated sound being reflective of the sound made by the natural prey, i.e., squeak for a mouse or chirp for a bird.

The sound device 70 includes a battery compartment 72 holding a plurality of replaceable batteries. The sound device 70 also includes a speaker (not shown) positioned within the housing 10. A plurality of speaker holes 74 are provided to better allow the sound to propagate from within the housing.

Figure 6:
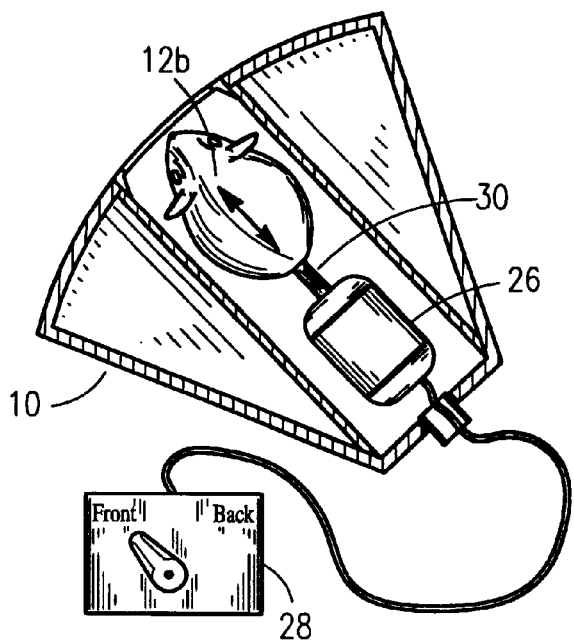
FIG. 6 illustrates a first alternate embodiment of the present invention.

FIG. 6 illustrates a second embodiment of the present invention. In this embodiment, the locomotion means is an electric motor 26. The electric motor 26 is mechanically connected to the pet amusement object 12b. The motor 26 is electrically connected to a power supply controller 28. The pet owner controls the power supply controller 28. In one embodiment, the operator may be able to select the direction of the toy-like object to move forward out of the housing or backwards into the housing. A timer may also be provided with the electric motor 26 to extend and retract the pet amusement object 12b on a periodic basis to engage the pet.

Figure 7:
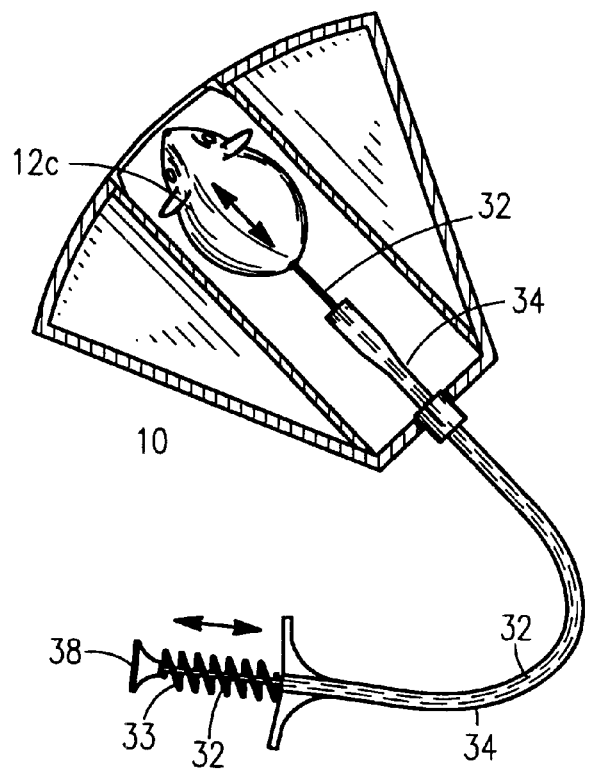
FIG. 7 illustrates a second alternate embodiment of the present invention.

A third embodiment of the locomotion means is illustrated in FIG. 7. This means consists of a wire 32 enclosed in an outer casing 34. The wire 32 is connected to a handle 38 at an end away from the housing. The handle 38 may have a spring 33 between it and the outer casing. The end of the wire 32 opposite the handle 38 is attached to the pet amusement object 12c. As the handle 38 is pressed forward, the spring 33 is compressed against the outer casing 34. In a preferred embodiment, the wire 32 is rigid, such that the action of pressing the handle 38 forward, forces the pet amusement object 12c forward out of the housing. When the handle 38 is released, the spring 33 also releases and the wire 32 and handle 38 move backwards, and the pet amusement object 12c moves backward into the housing.

Figure 8A:
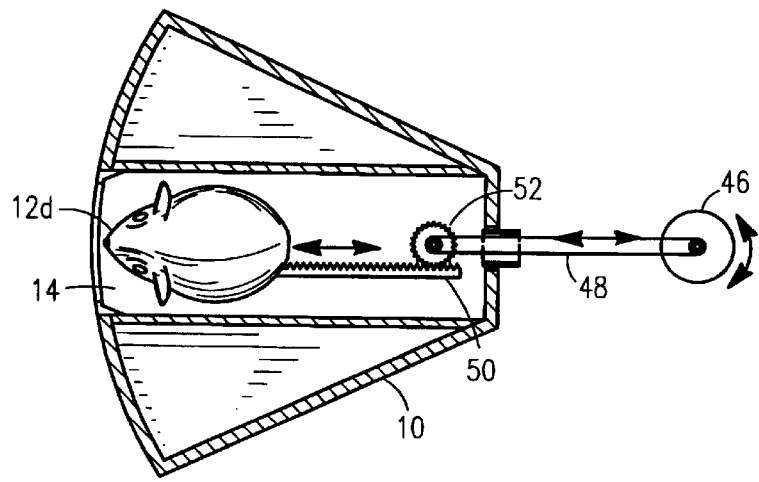
FIG. 8A and FIG. 8B illustrate alternate locomotion means for the pet amusement object.
Figure 8B:
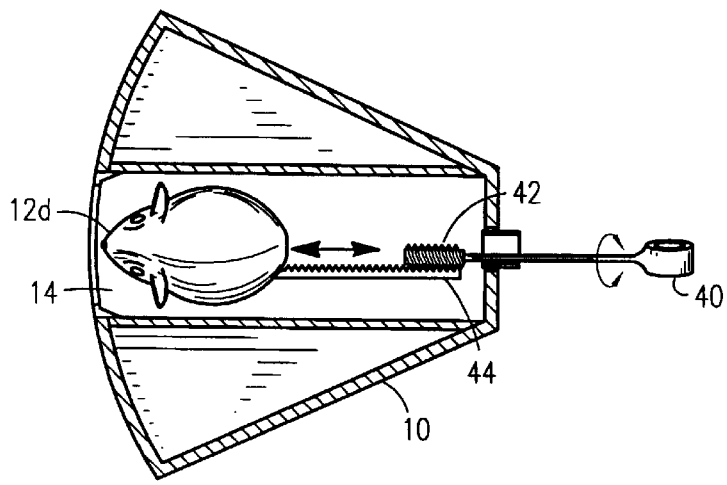

FIGS. 8A and 8B illustrate another locomotion means for the pet amusement object 12 in the present invention. As shown in FIG. 8A, the pet-amusement object 12d is connected to a rack 50. A mating gear or pinion 52 meshes with the rack 50 to move the pet amusement object 12d into and out of the housing 10. The gear 52 may be operated by a variety of mechanical means. A reel or pulley system may be used wherein a reel handle 46 is used to turn a cable 48 or other connector which is connected to the gear 52. Other known mechanical means may be used to turn the gear mechanism to move the rack 50 and thus the pet amusement object 12d.

FIG. 8B shows another rack and gear type mechanism. In this embodiment, a screw-like gear 42 is connected to a handle 40. The screw-like gear 42 meshes with threads on a rack 44 which is connected to the pet amusement object. As the handle 40 is rotated, the screw-like gear 42 rotates to move the rack 44 and thus the mouse out of and back into the housing, depending on the direction in which the handle 40 is turned.

Figure 9:
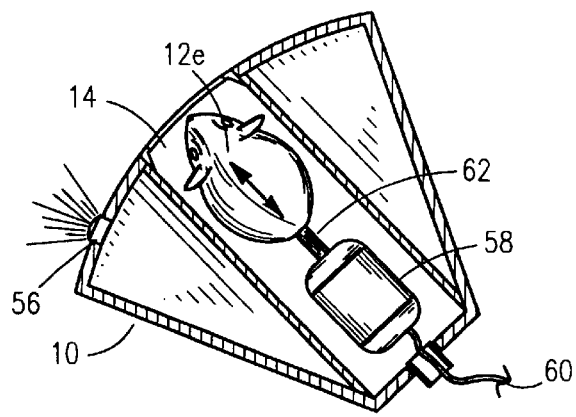
FIG. 9 illustrates an additional alternate locomotion means for the pet amusement object.

A fifth embodiment of the locomotion means associated with the present invention is shown in FIG. 9. This embodiment uses a light sensor or "electric eye" device 56 that is sensitive to motion or light. One type of motion or light sensitive device is disclosed in U.S. patent application Ser. No. 09/778,543. The motion or light sensitive apparatus 56 is electrically connected to a motor 58 which is connected to a power supply 60. The motor 58 is mechanically connected via attachment member 62 to the pet amusement object 12e. The device may operate as follows: the toy-like object 12e is extended out of the housing. When the device senses that an owner's pet is near the opening of the housing 10, it will communicate with the motor 58 to retract the pet amusement object 12e back into the housing 10. When the pet backs off, the sensor 56 will communicate with the motor 58 to extend the pet amusement object 12e out of the housing again. This stimulates interaction with the pet as it tries to catch the pet amusement object 12e while it is extended. The device may also operate in the opposite direction.

It should be understood that the pet amusement object 12e can extend various distances out of the housing and that the distance that the object may extend may be adjustable. The disclosure is intended to describe preferred embodiments of the present invention.

2. Operation of the Preferred Embodiment

To use the present invention, the user manually compresses the external bellows 21 causing air to be forced into the internal bellows 22 via the tube 22. As air is forced into the internal bellows 22, the internal bellows 22 expands, thus propelling the mouse forward and out of the cavity 11 of the housing 10, and in turn, actuating the sound device 70 to emit the natural sound of the selected prey. When user releases the external bellows 21, the air is forced to flow from the internal bellows 22 back into the external bellows 21 via the tube 23, thereby causing the mouse to retract back into the cavity 11 of the housing 10.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be broadly limited only by the following Claims.

What is claimed is:

1. An interactive pet toy comprising:
   a housing, said housing includes a hollow top and a hollow bottom, wherein said hollow top has ridges along an inner surface thereof, and said hollow bottom has corresponding grooves along an inner surface thereof, whereby said ridges of said hollow top match up with said corresponding grooves of said hollow bottom so as to allow said hollow top to be fittingly joined to said hollow bottom;
   a pet amusement object;
   locomotion means, said locomotion means effectuates extension of said pet amusement object outside said housing and effectuates retraction of said pet amusement object into said housing, said locomotion means comprising a support carriage, said support carriage is defined as having U-shaped configuration, an external bellows, said external bellows has an accordion shape, an internal bellows, said internal bellows is defined as having an accordion shape, and said internal bellows is smaller in size than said external bellows; and
   a sound device, said sound device emits a prerecorded sound in response to movement or propulsion/retraction of said pet amusement object.

2. The interactive pet toy of claim 1, wherein said support carriage includes a convex channel having an upper surface upon which a bottom of said pet amusement object is affixed.

3. The interactive pet toy of claim 1, wherein said support carriage further includes a pair of track arms, wherein each track arm of said pair of track arms extends perpendicularly from opposed outer sidewalls of said support carriage, said pair of track arms is designed to slidably engage said elongated slots within said cavity.

4. The interactive pet toy of claim 3, wherein each said track arm includes a guide arm vertically oriented with respect to each said track arm, said guide arm provides a contact surface against which an opposing sidewall of said cavity engages, thereby preventing lateral movement by said support carriage during propulsion and retraction of said pet amusement object.

5. The interactive pet toy of claim 1, wherein said external bellows and said internal bellows are connected by an elongated, flexible tube, said internal bellows has a forward end connected to a rear portion of said pet amusement object via adhesive.

6. The interactive pet toy of claim 5, wherein said external bellows, said elongated, flexible tube, said internal bellows, and said pet amusement object are connectively joined and sealed air-tight so as to allow air flow between said external bellows and said internal bellows, but preventing an escape of air from said external bellows and said internal bellows, and whereby manual compression of said external bellows forces air into said internal bellows via said elongated, flexible tube, and as air is forced into said internal bellows, said internal bellows expands, thus propelling said pet amusement object forward and out of said cavity of said housing, and whereupon said external bellows is released, air is forced to flow from said internal bellows back into said external bellows via said elongated, flexible tube, thereby causing said pet amusement object to retract back into said cavity of said housing.

7. The cover as recited in claim 1, wherein said hollow top and said hollow bottom are held together via an adhesive.

8. The interactive pet toy of claim 1, wherein said housing defines an opening of a circular configuration located at an end of said housing, wherein said opening provides passage to a cavity, said cavity is coaxially disposed behind said opening, and wherein said cavity serves to accommodate said pet amusement object.

9. The interactive pet toy of claim 8, wherein said cavity has elongated slots extending linearly down opposing sidewalls within said cavity.

10. The interactive pet toy of claim 8, wherein said housing further defines stopper elements located inside a perimeter surface of ;aid opening in order to prevent said pet amusement object from overextending out of said housing.

11. The interactive pet toy of claim 1, wherein said housing has a plurality of depressions formed along an outer surface thereof to resemble Swiss cheese, and a plurality of speaker holes to allow sound to propagate from within said housing.

12. The interactive pet toy of claim 1, wherein said pet amusement object is a toy mouse.

13. The interactive pet toy of claim 1, wherein said sound device is held within an interior cavity of said pet amusement object, said sound device includes a shaker barrel activator, a prerecorded sound chip, a battery compartment, and a source of electrical power.

14. The interactive pet toy of claim 13, wherein said sound device is configured so as to facilitate simulation of a natural sound of said pet amusement object.

15. An interactive pet toy comprising:

a housing, said housing is designed to accommodate a pet amusement object;

locomotion means, said locomotion means effectuates extension of said pet amusement object outside said housing and effectuates retraction of said pet amusement object into said housing, wherein said locomotion means comprises a wire, said wire is enclosed in an outer casing, wherein said wire is connected to a handle at an end away from said housing, said handle has a spring located between said handle and said outer casing, wherein an end of said wire opposite said handle is attached to said pet amusement object, whereby pressing said handle forward urges said spring to be compressed against said outer casing; and a sound device, said sound device emits a prerecorded sound which simulates a natural sound of said pet amusement object in response to movement or propulsion/retraction by said pet amusement object.

16. An interactive pet toy comprising:

a housing, said housing is designed to accommodate a pet amusement object;

locomotion means, said locomotion means effectuates extension of said pet amusement object outside said housing and effectuates retraction of said pet amusement object into said housing, wherein said locomotion means comprises a rack connected to said pet amusement object, wherein a mating gear meshes with said rack to move said pet amusement object into and out of said housing, said mating gear is operable via a pulley system which employs a reel handle to turn a cable which is connected to said mating gear; and a sound device, said sound device emits a prerecorded sound which simulates a natural sound of said pet amusement object in response to movement or propulsion/retraction by said pet amusement object.

17. An interactive pet toy comprising:

a housing, said housing is designed to accommodate a pet amusement object;

locomotion means, said locomotion means effectuates extension of said pet amusement object outside said housing and effectuates retraction of said pet amusement object into said housing, wherein said locomotion means comprises a light/motion sensor sensitive to motion or light, said light/motion sensor is electrically connected to a motor, wherein said motor is connected to a power supply, said motor is mechanically connected via an attachment member to said pet amusement object; and a sound device, said sound device emits a prerecorded sound which simulates a natural sound of said pet amusement object in response to movement or propulsion/retraction by said pet amusement object.

18. An interactive pet toy comprising:

a housing, said housing is designed to accommodate a pet amusement object;

locomotion means, said locomotion means effectuates extension of said pet amusement object outside said housing and effectuates retraction of said pet amusement object into said housing, wherein said locomotion means is an electric motor, said electric motor is mechanically connected to said pet amusement object, and said motor is electrically connected to a power supply controller, and wherein a pet owner controls said power supply controller; and a sound device, said sound device emits a prerecorded sound which simulates a natural sound of said pet amusement object in response to movement or propulsion/retraction by said pet amusement object.

* * * * *